United States Patent [19]

Kobold

[11] Patent Number: 4,611,105

[45] Date of Patent: Sep. 9, 1986

[54] DEVICE FOR THE MEASUREMENT OF THROUGH-FLOW WITH POTENTIAL-FREE END CONTACT SWITCH

[76] Inventor: Klaus Kobold, Sodener Str. 120, D-6233 Kelkheim, Fed. Rep. of Germany

[21] Appl. No.: 763,632

[22] Filed: Aug. 8, 1985

Related U.S. Application Data

[63] Continuation of Ser. No. 494,088, May 12, 1983, abandoned.

[30] Foreign Application Priority Data

Aug. 11, 1982 [DE] Fed. Rep. of Germany ... 8222641[U]

[51] Int. Cl.⁴ ............................................. H01H 36/00
[52] U.S. Cl. .............................. 200/81.9 M; 73/861.56; 335/205
[58] Field of Search ............ 200/81.9 M, 84 R, 84 B, 200/84 C; 335/205, 206; 73/861.56; 340/624

[56] References Cited

U.S. PATENT DOCUMENTS 3,224,270 12/1965 Karol et al. ...................... 73/861.56

FOREIGN PATENT DOCUMENTS 1071359 12/1956 Fed. Rep. of Germany ... 73/861.56
1604247 12/1981 United Kingdom .......... 200/81.9 M

OTHER PUBLICATIONS

IBM Technical Disclosure Bulletin, vol. 9, No. 6, Brodsky et al, "Air Flow or Air Pressure Sensing Device", Nov. 6, 1966, p. 624.

*Primary Examiner*—A. D. Pellinen
*Assistant Examiner*—Ginsburg, Morris
*Attorney, Agent, or Firm*—Keil & Weinkauf

[57] ABSTRACT

A device, disposed in a tube line, for the through-flow measurement of gases or liquids according to the float element principle with a float element (4) which is disposed in a narrow measuring tube (3), the measuring tube containing an axially magnetized magnet with a diameter of 1 to 8 mm, and with a subminiature protective gas contact switch (5) which is disposed laterally adjacent the measuring tube (3) and which has an operating sensitivity of 5 to 120 ampere turns. The device may be enclosed in a housing (2).

5 Claims, 9 Drawing Figures

DEVICE FOR THE MEASUREMENT OF THROUGH-FLOW WITH POTENTIAL-FREE END CONTACT SWITCH

This is a continuation of application Ser. No. 494,088, filed May 12, 1983, now abandoned.

Subject of the invention is a device for the through-flow measurement according to the float element principle, with which very small quantities of gases or liquids may be measured and which have a switch with a potential-free end contact.

Through-flow measuring apparatus according to the float element principle are known in which, in a tube with a measuring section, there is disposed a measuring element with an axially magnetized magnet and which, on the outside of the measuring tube contain a longitudinally displaceable protective gas contact switch.

However, heretofore these devices could not be produced for small through-flow quantities because the miniaturization of switch and magnet containing float elements had not been possible on account of the absence of suitable materials and miniaturized designs. Through further technical deveopment subminiature contact switches (so-called reed contacts) with low operating sensitivity at first became available, however, the miniaturization of the measuring device with the float element encountered substantial difficulties because correspondingly small magnets with sufficient field strength were not available.

Object of the invention is to provide a design of a flow meter for through-flow measurement of very small quantities which has a switch with potential-free end contact.

This object is met by a device for the through-flow measurement of gases or liquids according to the float element principle, with a measuring element disposed in a narrow measuring tube, which element contains an axially magnetized magnet and a protective gas contact switch disposed laterally adjacent the measuring tube, characterized in that the measuring tube has an inner diameter of 3 to 10 mm, the float element has a diameter-length ratio of 1:1 to 1:3 and the magnet contained therein has a diameter of 1 to 5 mm and a length of 1 to 8 mm at a diameter-length ratio of 1:1 to 1:3 and the protective gas contact switch is a subminiature switch with a glass tube diameter of 1 to 3.5 mm and an operating sensitivity of 5 to 120 ampere turns and is disposed in a holding device at least partially surrounding the measuring tube.

The device consists of a measuring tube with an inner diameter of 3 mm to 10 mm, preferably 3 to 7 mm, and an outer diameter of 7 to 16 mm, the measuring tube being provided at its ends with tube-line connecting facilities. In the embodiment the inner diameter of the measuring tube is 6.0 to 6.5 mm.

The length of the measuring tube preferably is 150 mm or 100 mm, it can also be shorter or longer, for example from 30 mm to 500 mm and more, or 30 to 100 mm or 30 to 150 mm.

The float element disposed in the measuring section within the tube has a diameter-length ratio of 1:1 to 1:3, preferably 1:1.5 to 1:3, an axially magnetized miniature magnet being contained in this element. This magnet may be encapsulated in the float element. However, it is also possible to provide the miniature magnet, for the purpose of weight reduction of the float element, with a plastics covering of polytetrafluorethylene, polyvinylidefluoride or polyamide in the form of a coating or a shrunk-on hose. In the measuring tube limit means for the float element are provided at the ends of the measuring section. The tube which is preferably transparent permits visual determination of the position of the float element as the latter is lifted in the vertically disposed measuring instrument by means of the medium flowing therethrough. The magnet has a diameter-length ratio of 0.2:1 to 1:3, preferably of 1:1 to 1:2 at a length of 1 to 8 mm and a diameter of 1 to 8 mm, preferably length and diameter are 1 to 5 mm. It preferably consists of a deformable permanent magnet material, for example, suitable materials on the basis of alloys containing chromium/cobalt/iron or aluminum/nickel/cobalt or cobalt/samarium ($CO_5Sm$) or cobalt/rare-earths or platinum/cobalt. These are anisotropic alloys with a high remanence of 0.55 to 1.05 tesla. However, isotropic alloys may also be used for the production of the magnets. The magnets used have a maximum energy product $(B \times H)_{max}$ of 60 to 220 kilojoule/$m^3$. The coercitive feild strength of the induction is approximately 500 to 800 kA/m, that of the polarization 1500 to 2500 kA/m.

In the flow meter according to the invention with contact means, the measuring tube is made of glass or correspondingly stable, transparent plastics material which is tightly fitted in a support frame in order to make installation in tube lines possible. If the measuring device according to the invention is to be used merely as a flow guard the tube in which the float element moves may also be made of an opaque antimagnetic material, for example plastics, antimagnetic metal alloys. In order to make switching by means of small magnets possible the provision of a protective gas contact switch with a correspondingly low operating sensitivity adjacent the measuring tube is required. Such subminiature contact switches with an operating sensitivity of 5 to 120 ampere turns or 5 to 60 ampere turns or 5 to 32.5 ampere turns or 5 to 20 ampere turns, the preferred operating sensitivity being from 7 to 12 ampere turns, have contacts sealed in narrow glass tubes, the contacts making a switching power of up to 10 watts at 220 volts possible, for example a switching power of 3 watts at 28 volts switching D.C. voltage or at 0.11 ampere switching D.C. current. The glass tubes have a diameter of 1 to 3.5 mm and a glass body length of 15 to 30 mm. The switching time including bounce time is 0.5 msec, preferably 0.3 msec. The contact material is rhodium (Rh), the resonance frequency is 4000 Hz.

The protective gas contact may be
(a) a make contact, that is the contacts are open without the magnet force,
(b) a break contact, that is the contacts are closed without the magnet force,
(c) a transfer contact, that is one contact is closed without the magnet force, another contact is open, and a transfer takes place in response to the magnet force.

These miniature contact switches are commercially available and, for the purpose of the invention, they are embedded in a holding device. This holding device or contact carrier for the contact switch may be made from square material which is electrically non-conductive. Since the material, in addition, shall have a low water- or moisture-absorption, plastics is the preferred material. Particularly suitable are polyvinylchloride, polyethylene or polyfluorized materials such as PVDF.

The material block for receiving the switch may be a cube or a parallelopiped with an edge length of approximately 20 to 30 mm, preferably a parallelopiped with 20 mm edge length of the square cross-section and with a 20 mm length. The square block has a preferably asymmetrically disposed bore, the inner diameter of which is equal to or only slightly smaller than the outer diameter of the measuring tube. The wall material of the bore which is asymmetrically disposed in the vicinity of the outer margin is split longitudinally at the thinnest portion of the bore, for the formation of a narrow slot of 1 to 5 mm width. By virtue of the elasticity of the used materials, such as plastics, the introduced measuring tube is automatically held by clamping due to the elastic tension (and it is in addition longitudinally displaceable as desired). In this manner a stable self-holding action is produced so that an additional locking device, as is conventionally used, is not required. The holding block may be longitudinally displaceable relatively to the measuring tube, or it may be firmly fixed in a predetermined position.

The lengthwise opening in the wall of the block insures that the measuring scale provided therebelow can be read without obstruction, that is there is a considerable advantage as compared with a closed holder, for example a ring. In addition, the relatively small float element is visible at all times.

In order to make the float element more visible, the holding block is formed so that it at least partially surrounds the measuring tube. This is effected by a corresponding strongly asymmetric disposal of the longitudinal bore for the measuring tube. Thus the measuring tube may be located up to one-half or more of its circumference outside of the holding block.

Because of the absence of a self-holding action of the block in this design, it is necessary to secure the holding block at the measuring tube in a suitable manner, for example by placing it in a housing or by mounting it by means of clamps. Opposite the opening on the viewing side, the block, in the bore wall has a longitudinal groove passing all the way therethrough, the groove having a width greater than or equal to ($\geq$) the outer diameter of the protective gas contact. The depth of the groove is such that, with the holder slid on or fixed, the reed contact is immediately contiguous to the measuring tube, without however any pressure stresses in the measuring tube being transmitted to the reed contact glass capsule. Two horizontal bores in the holding block which lead to the outside receive the bent-up contact terminals of the reed contact, these terminals, in turn, being connected with two suitable insulated copper wires or stranded cables, whereby the electric connection to a following switching unit may be effected.

The horizontal bores have a diameter larger than the diameter of the two connecting lines, in order that, upon assembly, sealing with an insulating resin or silicon mass may be carried out.

The holding device or block may also be formed by enclosing the protected gas contact, in keeping with the required outer shape, in a mass of casting resin.

As the float element with its built-in subminiature magnet, which element is disposed inside the measuring tube, comes into the range of the switching contacts of the subminiature reed contact—which, with the holder is contiguous to the outside of the measuring tube—, the switching contacts, in the make contact embodiment, are closed in response to the magnetic field. By displacing the clamping-holding device any desired height of the float element position may be indicated within the measuring tube section. In this manner a signal generation is insured as soon as a predetermined flow quantity has been reached, and an opposite signal generation as soon as this quantity is fallen short of or is exceeded.

This design results in a monostable switching performance, that is only in a predetermined relative position of the measuring element and contact is the contact closed and a signal transmitted or generated.

For a bistable switching performance two miniature contacts are required in the holding block which are connected in the switching circuit for signal generation in a predetermined manner.

The contacts in the holder are monostable and they switch in impulse-like fashion.

Contact 1 (lower contact) resets the digital switching device (cancellation).

Contact 2 sets the switching device.

Alternatively, the operation may also be reversed, that is contact 1 is setting and contact 2 resetting (cancelling), depending on whether the following relay which is operated by amplifying electronic circuitry is to work in the normally released or the normally operated mode.

Operation

The holding device with two switching contacts which are serially disposed in the longitudinal direction can be set in continuous adjustments on any point within the indicating range. The float element which is lifted out of its normal position by virtue of the flow through the measuring tube magnetically actuates contact 1 (lower contact) and thereby triggers the resetting of a digital switching device.

With increasing through-flow quantity the float element advances and closes contact 2 (upper contact), contact 1 being first opened; in this manner the setting of the digital switching device is triggered and, by means of the electrically amplified signal, the operation of a relay is brought about.

Through a corresponding storing action of the digital switching device the signal is maintained even when the float element cannot keep contact 2 closed any longer due to the distance of the magnet having become too great, for example since the through-flow has further increased. Only after the float element drops and operates contact 1 due to a lower through-flow quantity, is the digital switching device reset and the output relay released.

The advantage of the design according to the invention resides in that in this way extraordinary low through-flow quantities can still be reproducibly measured and that a potential-free contact switch is provided which triggers a signal upon the existence of a desired quantity. By a corresponding design of the circuit and with two protective gas contacts, a bistable switching performance can also be obtained.

Possible measuring ranges for the through-flow quantities are, for example:

| Water or other Liquids l/h |
|---|
| 0.001–0.01 |
| 0.01–0.1 |
| 0.25–2.5 |
| 0.5–5 |
| 1.2–12 |
| 2.5–25 |

-continued

| Water or other Liquids l/h |
|---|
| 4–40 |
| 6–60 |

Air or other gases (1=liter under normal conditions)

| $l_N/h$ |
|---|
| 0.1–1 |
| 1–10 |
| 1.6–16 |
| 4–40 |
| 6–60 |
| 10–100 |
| 25–250 |
| 50–500 |
| 80–800 |
| 120–1200 |

The invention will now be described in greater detail with reference to the drawings:

FIG. 1 schematically shows the design of the device and its arrangement within a switching circuit.

Figure 1:
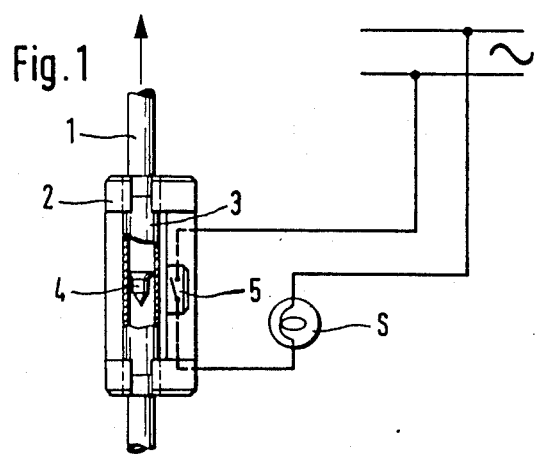

In FIG. 1 there is illustrated in principle how the flow measuring device according to the invention is built into a tube line 1 in a vertical position. The device consists of a housing 2 with a measuring tube 3 disposed therein in which, in turn, the float element 4 is contained. Enclosed in the float element 4 is a miniature magnet 6. The miniature magnet may however also have a shape largely approximating the shape of the measuring element and, in that case, it is provided with a plastic covering. Through this design with direct protective covering a weight reduction of the float element is made possible so that even smaller through-flow quantities may be detected. Next to the measuring tube a miniature protective gas contact switch 5 is disposed in such a way that it is longitudinally displaceable or firmly fixed and is settable in its elevation. In the drawing contact switch 5 has been shown greatly enlarged in order to make the structure more clearly visible. A voltage is connected to the contacts of the protective gas contact switch 5 by way of a signal device S. Upon closure of the contacts by means of the magnet force the voltage is connected to the signal device; this device may, for example be a lamp or a relay or the like.

Figure 2:
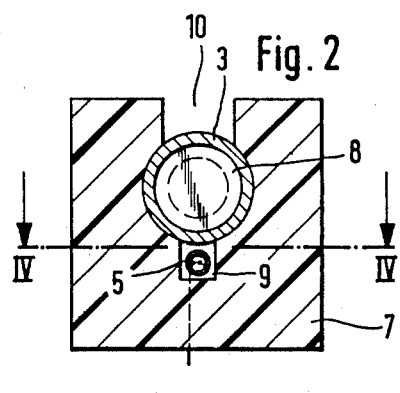
FIG. 2 shows a cross-section viewed from above through the holding device for the protective gas contact.

From FIG. 2 the asymmetrical disposition of the longitudinal bore 8 in the block shaped holding device 7 for the measuring tube 3 and groove 9, which leads therefrom, for the protective gas contact switch 5 may be seen. As a matter of principle the longitudinal bore 8 does not have to be asymmetrically disposed, however this arrangement improves the clamping action of block 7 for measuring tube 3 which is introduced into longitudinal bore 8. Inside the measuring tube, float element 4 is placed. The diameter of longitudinal bore 8 is equal to or slightly smaller than the outer diameter of the measuring tube 3; for example it is 1/10 to 1/13 mm smaller, in order to obtain a good clamping action. 10 designates the longitudinal slot on the front side of the holding device.

For a 10 mm diameter of the longitudinal bore 8 the block, for example, has an edge length of approximately 20 mm. On the one side of longitudinal bore 8 the wall material for the longitudinal slot 10 is removed. The longitudinal slot 10 may have a width of 1 to 5 mm, however it is preferably narrower, but always wide enough so that measuring element 4 remains visible when it arrives in this range of measuring tube 3. On the wall side of longitudinal bore 8 opposite longitudinal slot 10, groove 9 for receiving the protective gas contact switch 5 is disposed. This switch is embedded in groove 9 and its connecting wires are laterally led out through bores not shown in the figure.

Figure 3:
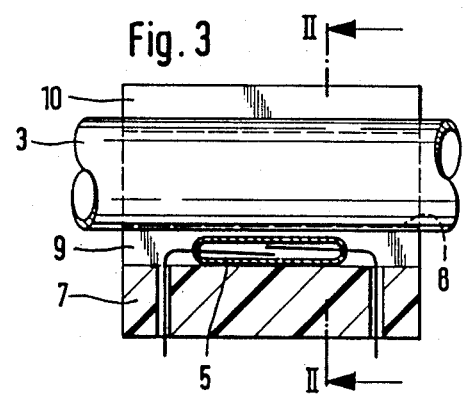
FIG. 3 shows a longitudinal section of the holding device along the vertical mid plane of FIG. 2.

FIG. 3 shows the same arrangement in longitudinal section along the vertical mid plane of FIG. 2, with the measuring tube 3 passed through bore 8. On the one side of the bore longitudinal slot 10 is formed, and on the opposite side groove 9 for receiving protective gas contact switch 5. In this figure the bores in block 7 for the passage of the connecting wires of contact switch 5 are illustrated, these bores being horizontal in the assembled condition.

Figure 4:
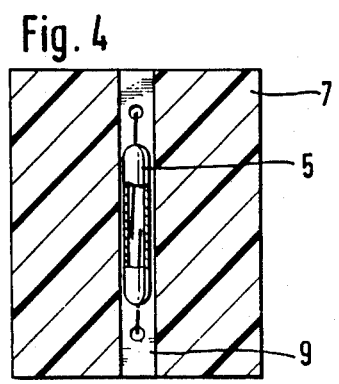
FIG. 4 shows a longitudinal section through the holding device along line IV—IV of FIG. 2.

FIG. 4 shows holding device 7 as seen from the front in section along line IV—IV of FIG. 2 with the protective gas contact switch 5 disposed in groove 9. Above and below protective gas contact switch 5 the laterally extending bores for the passage of the connection of contact switch 5 are provided.

In FIGS. 3 and 4, block 7 is illustrated as a parallelopiped with a square cross-section as in FIG. 2. The length of the parallelopiped may be, for example 25 to 30 mm at a length of the lateral edge of 20 mm. The protective gas contact switch in this case has an outer diameter of approximately 2 mm so that groove 9 must be made approximately 2.5 mm wide and deep. The fixing of the switch in the groove is carried out by means of suitable adhesives or sealing masses.

The holding device may, however, also be designed so that the protective gas contact switch 5 is embedded in a casting resin, whereby the outer form of the resulting element at least partially surrounds the measuring tube 3 or adjoins measuring tube 3 on the front side outside of the viewing field.

Figure 5:
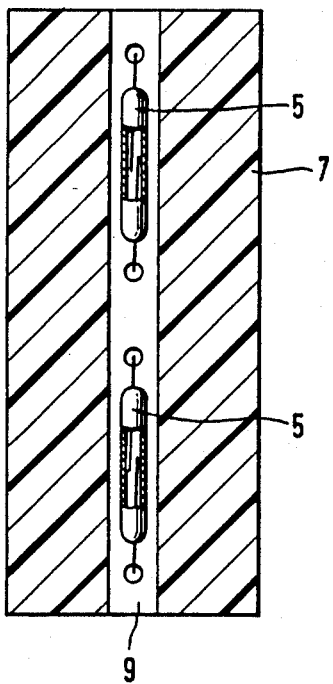
FIG. 5 shows a longitudinal section through the holding device with two protective gas contacts, as viewed from the front.
Figure 6:
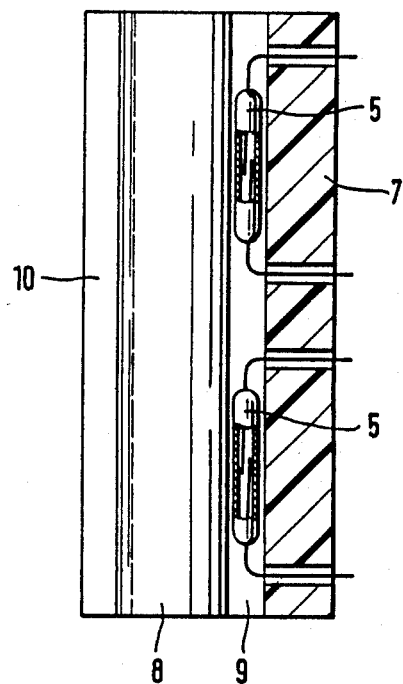
FIG. 6 shows a longitudinal section through the holding device with two protective gas contacts in side view.

FIGS. 5 and 6 show the design of holding device 7 with two protective gas contact switches 5 to make a bistable switching performance of the device possible. FIG. 5 is a longitudinal section, comparable with FIG. 4, taken from the front, and FIG. 6 is a longitudinal section, comparable with FIG. 3, taken from the side.

In FIG. 5 there is illustrated groove 9 for receiving the two protective gas contacts and longitudinal slot 10 extends on the face of block 7. The transverse bores for passing the connecting wires to the contact switches 5 are shown, their passage to the rear, however, is clearly visible in FIG. 6. In this FIG., 8 designates the longitudinal bore which has on its face longitudinal slot 10 and on its opposite side the groove.

Figure 7:
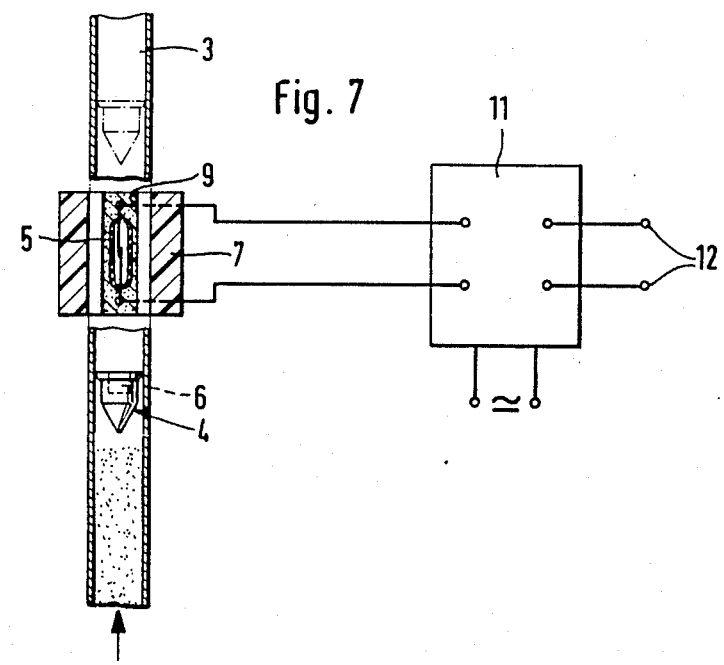
FIG. 7 shows the design of the device with monostable switching performance.

In FIG. 7 the arrangement and the circuit for monostable switching performance of the novel measuring device are shown. A medium streams through measuring tube 3 from bottom to top and the flow lifts float element 4 with the miniature magnet 6 disposed therein. Holding device 7 is clamped to measuring tube 3 at an elevation corresponding to the desired through-flow quantity. As soon as float element 4 has reached the height of the protective gas contact 5, its contacts are closed by the magnetic force and the contact protection relay 11 is operated. This relay in turn actuates the potential-free switching contact 12 as the relay output. Contact protection relay 11 may have a D.C. or A.C. voltage connected thereto, as indicated at the bottom terminals of this relay in FIG. 7.

Figure 8:
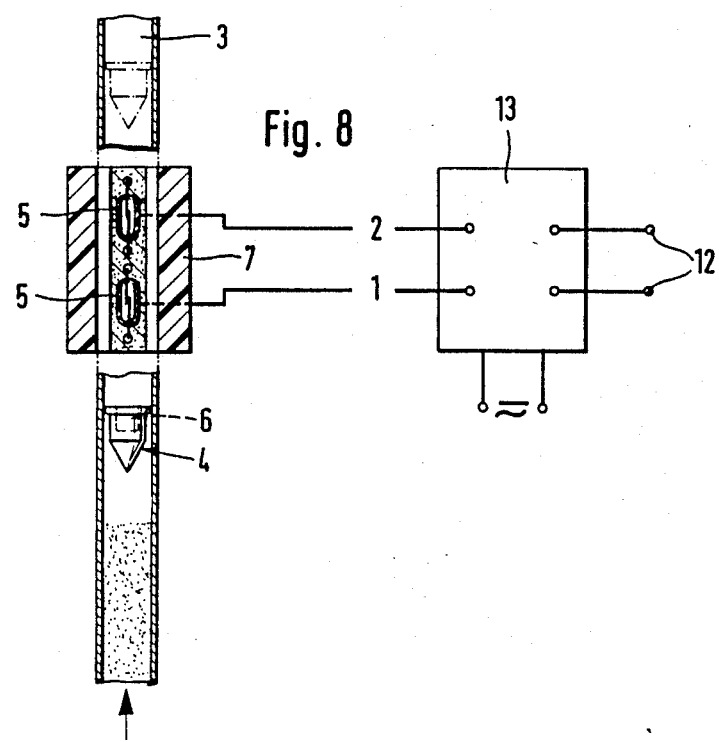
FIG. 8 shows the design of the device with bistable switching performance.

FIG. 8 shows the design for bistable switching performance with two protective gas contact switches 5 within the block-shaped hold device 7 which is slid over measuring tube 3. The float element 4, although lifted by the flow, is still below the switching point. It contains, cemented thereinto, an axially magnetized miniature magnet 6. Both protective gas contacts, so-called reed contacts, are connected with an electronic switching device 13, contact 1 with the first contact switch and contact 2 with the second contact switch. After the first contact has been reached, the electronic switching device 13 is supplied with a control pulse which resets, or returns to zero position, the switching device. With increasing flow velocity the measuring element 4 reaches the second protective gas contact 5 and triggers a second signal in the electronic switching device. This actuates the potential-free contact 12. The electronic switching device is designed so that this condition is maintained until the electronic switching device is returned to zero position by actuation of the first contact. The electronic switching device is supplied with a suitable voltage from a D.C. or A.C. source, as indicated at the bottom terminal of this device. Contacts 12 of the switching device are in the form of a potential-free switching contact.

Figure 9:
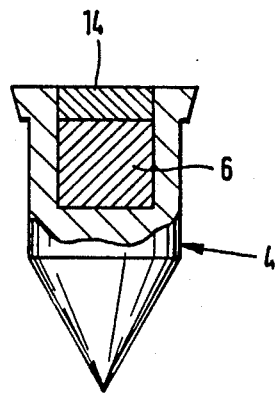
FIG. 9 shows, to an enlarged scale, a longitudinal section through a measuring element with encapsulated magnet.

FIG. 9 shows the float element 4 in longitudinal section with the magnet 6 inserted therein. This magnet is inserted into a corresponding bore of the float element 4 and is secured by means of a closure plug 14. Float element 4 has a cylindrical cross-section and it is conically tapered at its lower end. At the other end an enlarged outer rim is provided for stabilization. In a preferred embodiment the float element has a diameter of 6 mm and it is 10 mm long, the upper rim being 1 mm long and the cone-shaped portion 5 mm long.

Float element 4 may, however, also have a cylindrical cross-section with an enlarged outer rim for stabilization at each end. This form is preferred when the magnet is only provided with a protective covering of plastic material. The magnet which in the illustrated case is encapsulated has a diameter of 3 mm and it is 3 mm long. The magnetization of the magnets is axial in order to make possible the exertion of a force on the protective gas contacts which, in assembled condition, are laterally disposed.

In a simplified embodiment the measuring tube which is provided with a scale is not inserted into a separate frame but it has ends for line connections, and inside the measuring tube limiting inserts for the float element are provided at both ends of the measuring section, these inserts only slightly modifying the cross-section. The block-shaped holding device is slid onto the measuring tube. The device is longitudinally displaceable and it encloses the measuring tube like a resilient clamp, due to the elastic properties of the plastic block. In the embodiment with only partial enclosure of the measuring tube by the holding block the measuring tube and the block are connected with each other in a suitable fashion, for example by common arrangement within a housing or frame or by means of holding clamps. This mounting arrangement fixes the position of the protective gas contact switch or the two switches on the measuring tube. As a matter of principle, a longitudinally displaceable design of the holding block is possible also in this form.

What is claimed:

1. A measuring device for the through-flow measurement of gases or liquids according to the float element principle, said device comprising a narrow measuring tube, a float element disposed in said measuring tube, an axially magnetized magnet contained in said float element, and one or more protective gas contact switches disposed laterally adjacent the measuring tube,
   wherein the measuring tube (3) has an inner diameter of 3 to 10 mm,
   wherein the float element (4) has a diameter length ratio of 1:1 to 1:3 and the magnet (6) contained therein a diameter of 1 to 8 mm, at a diameter-length ratio of 1:1 to 1:3,
   wherein the one or more protective gas contact switches (5) are subminiature switches with a glass tube having a diameter of 1 to 3.5 mm and operating sensitivity of 5 to 120 ampere turns and
   wherein there is provided a holding devices (7) for said switches, said holding device at least partially surrounding the measuring tube (3) and being in the form of a block of a cube-shaped or parallelopiped-shaped block (7) having a groove (9), and
   the one or more protective gas contact switches (5) are disposed in said groove (9), said block (7) having a longitudinal bore (8) for receiving the measuring tube (3), and said groove (9) leading from the longitudinal bore (8), in such a way that the one or more switches are immediately contiguous to the measuring tube (3),
   whereby the through-flow measurement of very small quantities of gases or liquids is made possible.

2. A measuring device according to claim 1,
   wherein the longitudinal bore (8) has a diameter which is equal to or slightly narrower than the outer diameter of the measuring tube (3) and is disposed asymmetrically in the block (7), and
   wherein the wall material is removed in a longitudinal direction at the thinnest portion between the bore (8) and the outer surface of the block (7), for the formation of a slot (10) of 1 to 5 mm width.

3. A measuring device according to claim 1 or 2,
   wherein in the groove (9) two contact switches (5) are serially disposed in the longitudinal direction, with a mutual distance of 1 to 5 mm.

4. A measuring device according to claim 3,
   wherein said device comprises a bistable electronic switching device (13) having a potential-free switching contact (12), and two protective gas contacts, said two protective gas contacts being connected, by way of wire connections, to said electronic switching device (13) so that a bistable switching performance of said potential-free switching contact (12) is provided.

5. A measuring device according to claim 1, wherein said device comprises a contact protection relay (11), and wire connection means connecting the protective gas contact switch (5) to said contact protection relay (11).

* * * * *